United States Patent
Ono

(10) Patent No.: US 11,128,763 B2
(45) Date of Patent: Sep. 21, 2021

(54) IMAGE PROCESSING APPARATUS AND METHOD THEREFOR

(71) Applicant: CANON KABUSHIKI KAISHA, Tokyo (JP)

(72) Inventor: Shinichi Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/248,216

(22) Filed: Jan. 15, 2019

(65) Prior Publication Data

US 2019/0230231 A1 Jul. 25, 2019

(30) Foreign Application Priority Data

Jan. 25, 2018 (JP) .............................. JP2018-010404

(51) Int. Cl.
| H04N 1/00 | (2006.01) |
| H04N 1/56 | (2006.01) |
| H04N 1/46 | (2006.01) |

(52) U.S. Cl.
CPC ..... *H04N 1/00148* (2013.01); *H04N 1/00222* (2013.01); *H04N 1/00238* (2013.01); *H04N 1/00241* (2013.01); *H04N 1/46* (2013.01); *H04N 1/56* (2013.01)

(58) Field of Classification Search
None
See application file for complete search history.

(56) References Cited

U.S. PATENT DOCUMENTS

| 2003/0193692 | A1* | 10/2003 | Matsuyama | ....... H04N 1/33307 358/2.1 |
| 2004/0090655 | A1* | 5/2004 | Kimoto | .............. H04N 1/32112 358/500 |
| 2008/0231887 | A1* | 9/2008 | Sakagami | .......... H04N 1/00204 358/1.15 |
| 2010/0033756 | A1* | 2/2010 | Fujioka | .............. H04N 1/00214 358/1.15 |
| 2010/0245952 | A1* | 9/2010 | Muraishi | ............ H04N 1/00716 358/505 |
| 2014/0078550 | A1* | 3/2014 | Morita | .................. G06F 3/1205 358/1.15 |
| 2016/0006889 | A1* | 1/2016 | Kanno | ............... H04N 1/00225 358/1.15 |
| 2016/0274848 | A1* | 9/2016 | Suzuki | ............... H04N 1/00456 |

FOREIGN PATENT DOCUMENTS

JP 2013-106103 A 5/2013

* cited by examiner

*Primary Examiner* — Frantz Bataille
(74) *Attorney, Agent, or Firm* — Canon U.S.A., Inc. IP Division

(57) ABSTRACT

An image processing apparatus connected to an external user terminal includes a scanner unit that optically reads an original to acquire a scanned image, an information acquisition unit that acquires user information, an image storing unit that stores the scanned image in association with the user information, a type acquisition unit that acquires an image conversion type, which indicates a desired converted image type, from the external user terminal, and an image conversion unit that, in response to acquiring the image conversion type, reads out a scanned image from the image storing unit based on the user information and converts the read-out scanned image into an image of the acquired image conversion type.

12 Claims, 10 Drawing Sheets

Please find attached an image scanned with your favorite settings.

~603

601

If you need an image with a different image quality, please click the button below.

[Get a converted image.] ~604

IMAGE.jpg
602

IMAGE PROCESSING APPARATUS AND METHOD THEREFOR

BACKGROUND

Field

Aspects of the present disclosure generally relate to an image processing apparatus equipped with a scanning function and a method therefor.

Description of the Related Art

In a scan job operation method in conventional image processing apparatuses, such as multi-function printers (hereinafter referred to as "MFPs"), various types of settings are performed by the user at each required time using a menu screen that is displayed on a display unit such as a liquid crystal display (LCD). Items for such settings include, for example, image qualities of, for example, color and gray scale and a transmission destination of scanned data (see Japanese Patent Application Laid-Open No. 2013-106103).

While the LCD, which is capable of displaying abundant information, is generally used as a display interface, the LCD panel itself is expensive, so that the apparatus increases in cost. Therefore, an image processing apparatus equipped with no LCDs or equipped with a simple LCD only capable of displaying a status line or the like can be contrived. In the case of an image processing apparatus employing such a configuration, setting of a scanned image may not be able to be performed at the time of a scanning operation for an original, so that user convenience decreases.

For example, in a case where the original is a character-oriented document or a line image-oriented document, scanning the original as a binary image is useful to obtain a scanned image high in contrast, which is easily viewable. The character recognition rate in optical character recognition (OCR) for the scanned image can also be improved. However, if the default setting for a scanning operation of the image processing apparatus is previously set to color setting, even when the original is a character-oriented or line image-oriented document, the original would be scanned as a color image, so that the contrast of the scanned image becomes low. In a case where the frequently-used setting is previously set to binary image setting as user's favorite setting, even when the original is color and a color image is required as the scanned image, the original would be always scanned as a binary image.

SUMMARY OF THE INVENTION

According to an aspect of the present disclosure, an image processing apparatus connected to an external user terminal includes a scanner unit configured to optically read an original to acquire a scanned image, an information acquisition unit configured to acquire user information, an image storing unit configured to store the scanned image in association with the user information, a type acquisition unit configured to acquire an image conversion type, which indicates a desired converted image type, from the external user terminal, and an image conversion unit configured to, in response to acquiring the image conversion type, read out a scanned image from the image storing unit based on the user information and convert the read-out scanned image into an image of the acquired image conversion type.

Further features will become apparent from the following description of exemplary embodiments with reference to the attached drawings.

DESCRIPTION OF THE EMBODIMENTS

Various exemplary embodiments, features, and aspects will be described in detail below with reference to the drawings.

Constituent elements described in the exemplary embodiments are merely examples, and are not intended to limit the scope of the present disclosure.

Figure 1:
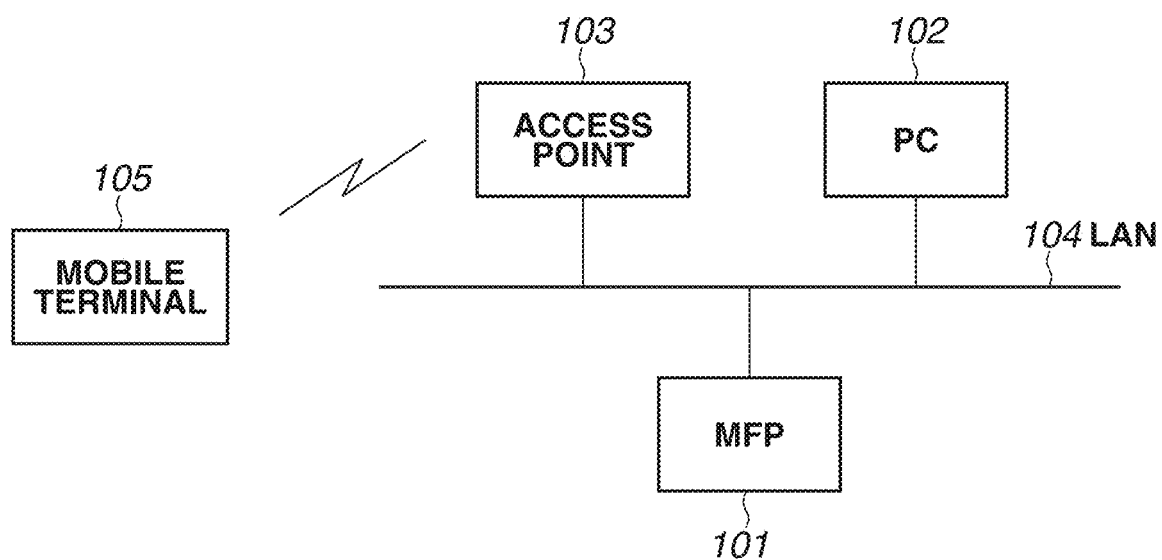
FIG. 1 is a diagram illustrating an overall configuration of a system including an image processing apparatus according to an exemplary embodiment.

FIG. 1 is a diagram illustrating an overall configuration of a system that includes an image processing apparatus according to an exemplary embodiment of the present disclosure and, for example, an external terminal (external user terminal) connected to the image processing apparatus via a network.

Referring to FIG. 1, the image processing apparatus is, for example, a multi-function printer (MFP) 101, and communicates with other apparatuses (for example, an external user terminal) on a network, such as a local area network (LAN) 104. A personal computer (PC) 102, which is, for example, an external user terminal, communicates with the MFP 101 via the LAN 104. The PC 102 can connect to the LAN 104 via a physical cable or can connect to the LAN 104 via an access point 103 by performing wireless communication with the access point 103. The access point 103 interconnects the LAN 104 and the PC 102 via wireless communication. The wireless communication can be Wi-Fi® or Bluetooth® of the standard, for example, IEEE 802.11a, 802.11b, 802.11g, 802.11n, or 802.11ac.

The LAN 104 interconnects the MFP 101, the PC 102, and the access point 103 and enables communication therebetween. It is common to use Ethernet for a physical layer and a link layer. A mobile terminal 105, which is, for example, an external user terminal (also referred to as a "communication terminal"), connects to the LAN 104 via the access point 103 to communicate with the MFP 101. The mobile terminal 105 has application software for cooperating with the MFP 101 installed thereon. The mobile terminal 105 performs setting of various operations, such as a scan operation or copy operation, via the application software, and can perform an operation cooperating with the MFP 101 based on such setting.

Figure 2:
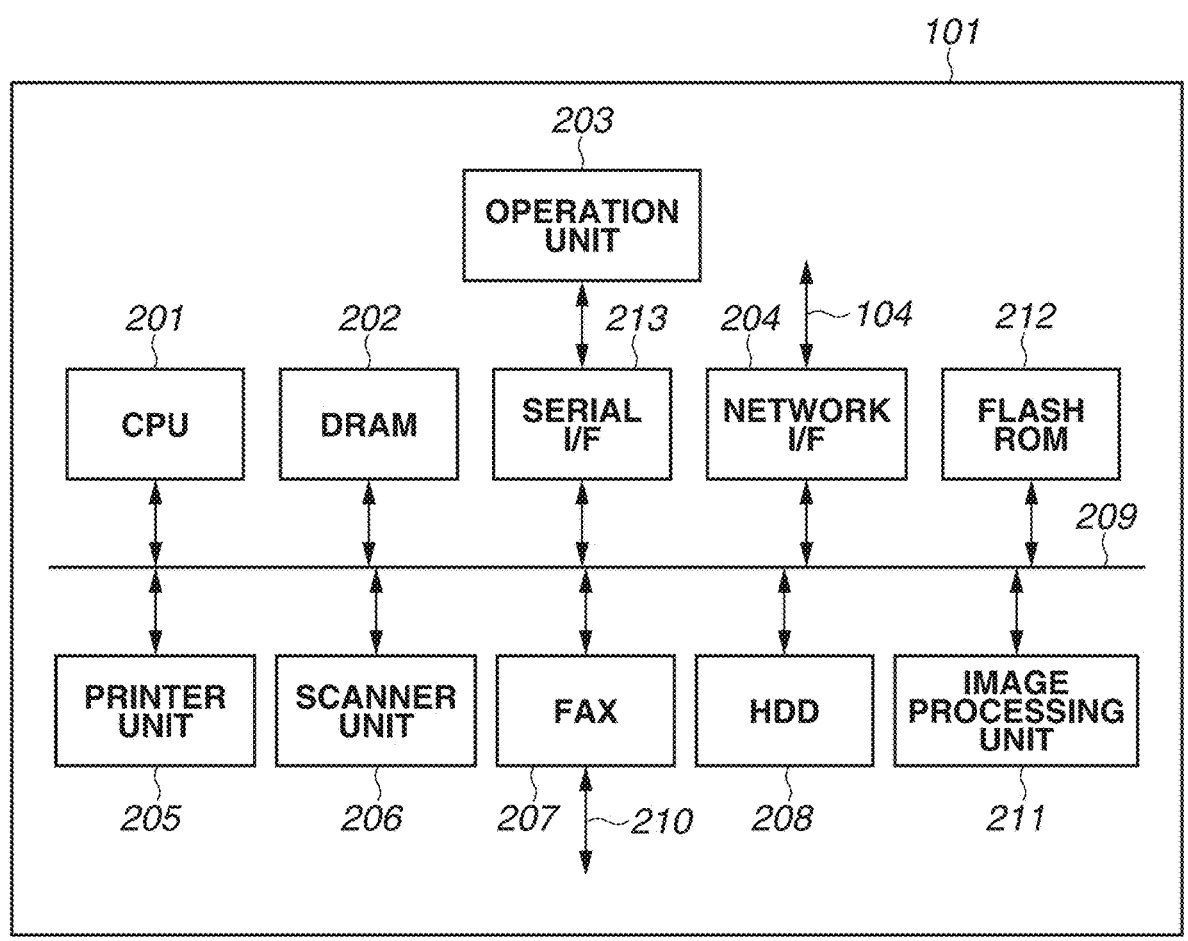
FIG. 2 is a block diagram illustrating an overall configuration of a multi-function printer (MFP).

FIG. 2 is a block diagram illustrating an overall configuration of the MFP 101. Referring to FIG. 2, a central processing unit (CPU) 201 controls the MFP 101. A volatile memory, for example, a dynamic random access memory (DRAM) 202, not only stores a program that is executed by the CPU 201 but also functions as a work area for temporary data. While, in the image processing apparatus according to the present exemplary embodiment, one CPU 201 performs each processing operation illustrated in a flowchart described below using a program loaded on one memory (DRAM 202), another configuration can be employed. For example, a plurality of processors, a plurality of RAMs, a plurality of ROMs, and a plurality of storages can cooperate with each other to perform each processing operation illustrated in a flowchart described below. Moreover, a hardware circuit, such as an application specific integrated circuit (ASIC), an application-specific instruction set processor (ASIP), or a Field Programmable Gate Array (FPGA), can be used to perform some processing operations. An operation unit 203 notifies the CPU 201 of an operation performed by the user via a serial interface (I/F) (operation-unit I/F) 213. A network I/F 204 connects to the LAN 104 to perform communication with an external apparatus.

A printer unit 205 prints image data on a sheet of paper. A scanner unit 206 optically reads an image on the surface of an original and converts the image into an electrical signal, thus generating a scanned image. A facsimile machine (fax) 207 connects to a public line 210 to perform facsimile communication with an external apparatus. A non-volatile memory, for example, a hard disk drive (HDD) 208, not only stores a program that is executed by the CPU 201 but also is used as a spool area for a print job, a scan job, or the like. The HDD 208 is also used as an area for storing and reusing a scanned image.

A signal bus 209 interconnects various modules to enable communication with each other. The public line 210 interconnects the fax 207 and an external apparatus. An image processing unit 211 performs processing operations such as conversion processing for converting a print job received by the network I/F 204 into an image suitable for printing to be performed by the printer unit 205, and noise removal, color space conversion, rotation, and compression of a scanned image obtained by reading performed by the scanner unit 206. The image processing unit 211 performs image processing of a scanned image stored in the HDD 208.

A flash read-only memory (flash ROM) 212 stores a program that is executed by the CPU 201 as well as default setting values of the MFP 101 and favorite setting values for the respective users. The serial I/F 213 interconnects the operation unit 203 and the signal bus 209. While, in the present exemplary embodiment, an MFP having a scan function and a print function is illustrated as an example of an image processing apparatus, the present exemplary embodiment is not limited to this. For example, the present exemplary embodiment can be applied to a single function peripheral (SFP) such as a network scanner.

Figure 3:
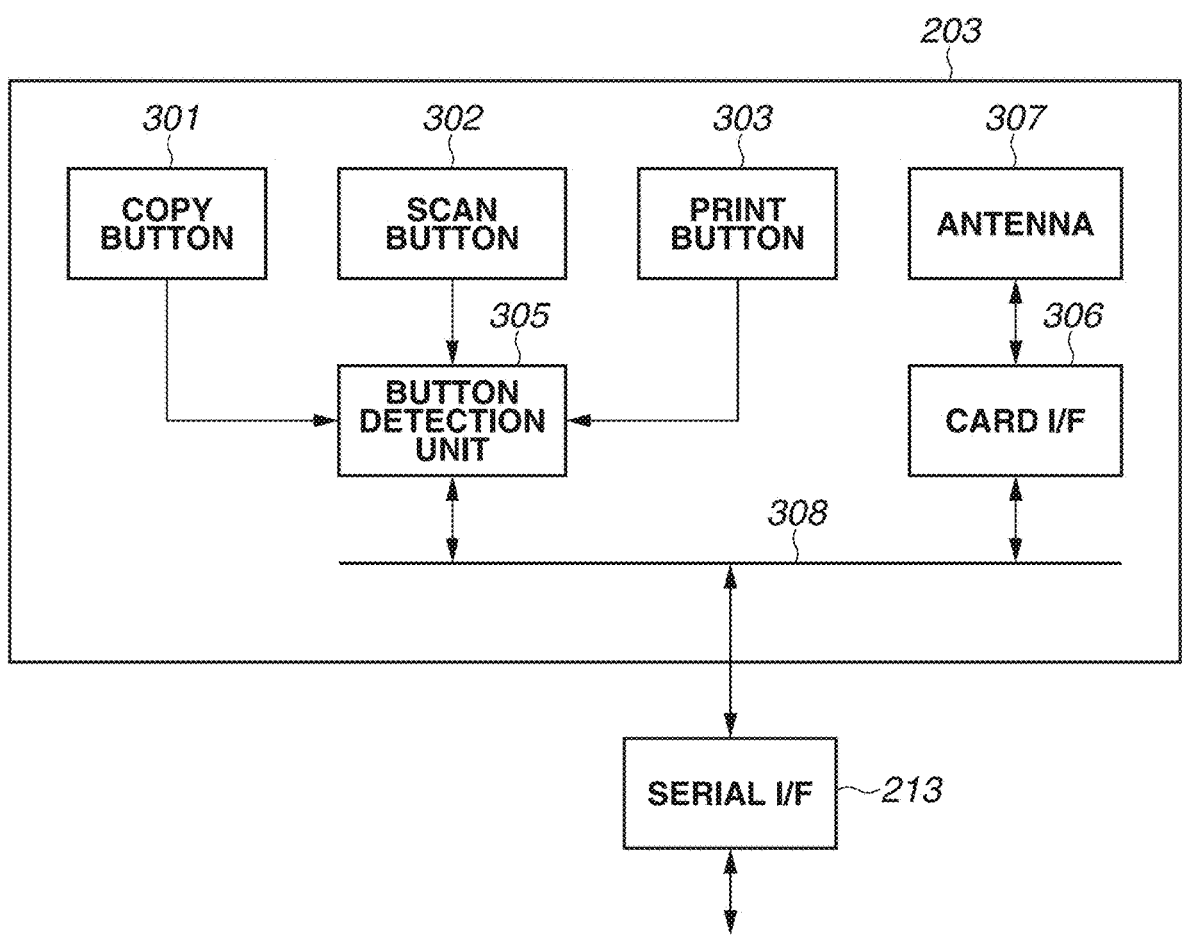
FIG. 3 is a block diagram illustrating a configuration of an operation unit.

FIG. 3 is a block diagram illustrating a configuration of the operation unit 203. Referring to FIG. 3, when a copy button 301 is pressed by the user to be turned on, the turning-on thereof is detected by a button detection unit 305. When a scan button 302 is pressed by the user to be turned on, the turning-on thereof is detected by the button detection unit 305. When a print button 303 is pressed by the user to be turned on, the turning-on thereof is detected by the button detection unit 305. The button detection unit 305 detects the turning-on or turning off state of each of the switches 301 to 303 and notifies the CPU 201 of the detected state via a signal bus 308 and the serial I/F 213. In this way, the operation unit 203 functions as a reception unit that receives a user operation.

When detecting that a non-contact card is held over an antenna 307, a card I/F 306 notifies the CPU 201 of such detection by interrupt, and then reads information about the non-contact card and writes the information into the DRAM 202. The antenna 307 magnetically joins with the non-contact card and performs wireless communication therewith.

Examples of the non-contact card include a card compliant with, for example, Near Field Radio Communication (NFC). In the present exemplary embodiment, a reader/writer mode, which enables reading and writing with respect to information about a non-contact card, in NFC is used. User information included in the non-contact card includes, for example, an identification number, an e-mail address, and favorite settings of operations of a user who owns the non-contact card.

Figure 4:
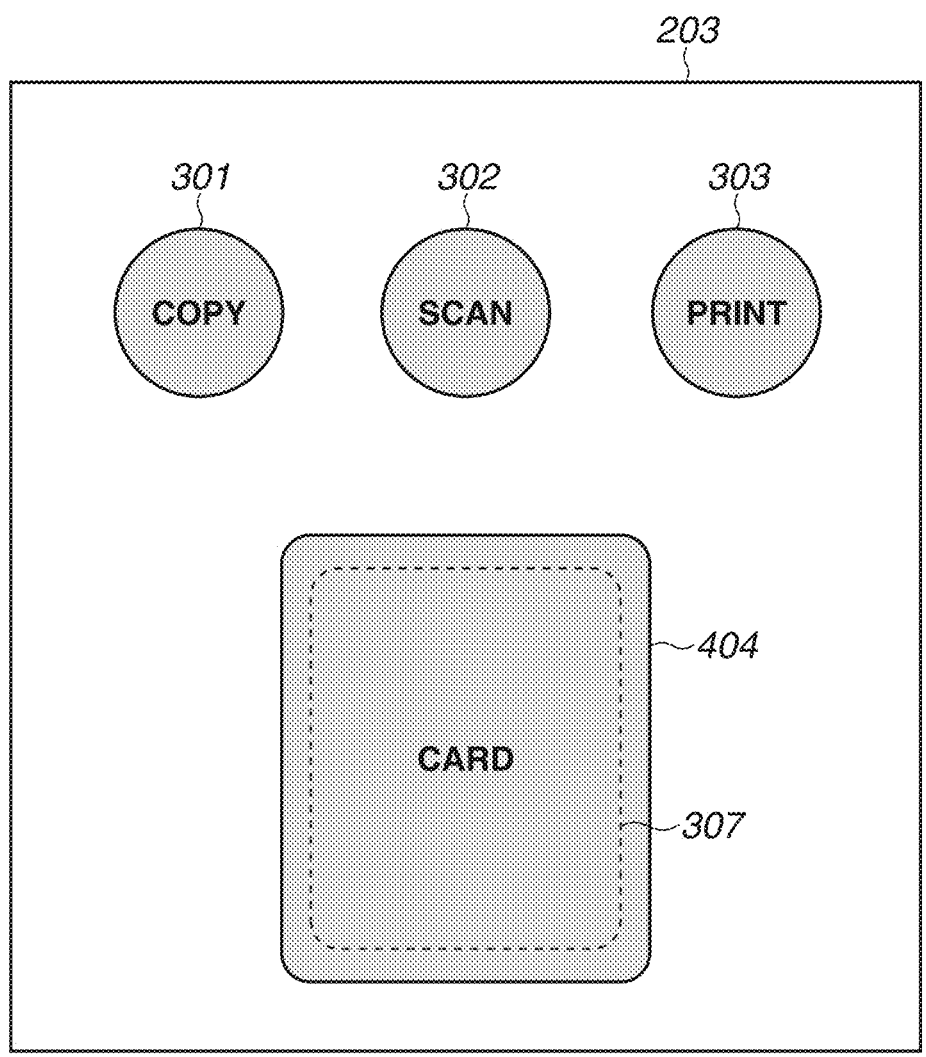
FIG. 4 is a diagram illustrating a configuration of an operation panel.

FIG. 4 illustrates a configuration of a top surface panel of the operation unit 203. Referring to FIG. 4, on the top surface panel, in addition to the buttons 301 to 303, a communication area 404 for communication with a non-contact card is located. The antenna 307 is located behind the communication area 404. When a non-contact card is held by the user in the vicinity of the upper surface of the communication area 404, a communication is performed between the non-contact card and the card I/F 306 via the antenna 307, so that reading and writing of information about the non-contact card are enabled. In such an operation unit 203, a display unit such as a liquid crystal display (LCD) is not particularly provided.

Here, a basic operation of the MFP 101 is described. When the copy button 301, the scan button 302, or the print button 303 is pressed by the user, the turning-on thereof is detected by the button detection unit 305, which then notifies the CPU 201 of that effect via the serial I/F 213. Then, the CPU 201 enters a state of being able to communicate with a non-contact card for a predetermined period. When the non-contact card is held by the user in the vicinity of the upper surface of the communication area 404 within the predetermined period, the user identification number of the non-contact card is read by the card I/F 306 and is then communicated to the CPU 201.

Accordingly, the CPU 201 performs user authentication, and, when the authentication is successful, enters a log-in state, which enables using the MFP 101. At the same time, the CPU 201 starts execution of an operation corresponding to the selected button.

During a period in which the MFP 101 is in a state of being able to communicate with a non-contact card, a button that has been pressed just before can be lit up by a lamp (not illustrated), so that the user can be informed that the non-contact card is ready to be read.

In the case of a copy operation, which is performed in response to the copy button 301, the scanner unit 206 reads an original (not illustrated) and stores image data obtained by reading in the DRAM 202. Next, the image processing unit 211 performs conversion of the read image data based on predetermined setting values stored in the flash ROM 212, and the printer unit 205 prints the converted image data on a sheet of paper. According to the utilization form of the user, the copy operation can be allowed to be performed in response to the copy button 301 being pressed without the need for login.

A print operation, which is performed in response to the print button 303, is assumed to be what is called hold printing. In that case, the user transmits a print job in advance from the PC 102 to the MFP 101 via the network I/F 204. After that, since the user is able to obtain a printed product only after logging in by the above-mentioned method, the printed product is unlikely to be seen by others.

A scan operation, which is performed in response to the scan button 302, includes transmitting a scanned image obtained by scanning an original and, therefore, requires login that is performed in the above-mentioned method. In the present exemplary embodiment, the e-mail address of the user is previously stored in the non-contact card, and the MFP 101 reads the stored e-mail address and sets the read e-mail address as a destination which is used in transmission processing for transmitting a scanned image.

The setting values which are stored in the flash ROM 212 will be described. The flash ROM 212 retains default setting values with respect to each of the functions included in the MFP 101, such as copy, scan, print, and fax.

Table 1 shows an example of default setting values which are stored in the flash ROM 212.

TABLE 1

| | Operation | | | |
|---|---|---|---|---|
| | Copy | Scan | Print | Fax |
| Paper size | Auto | Auto | Auto | Auto |
| Resolution | 300 dpi | 200 dpi | 300 dpi | 200 dpi |
| Density | 50% | 50% | 50% | 50% |
| Color/Monochrome | Auto | Auto | Auto | — |
| Two-sided/One-sided | Two-sided | One-sided | Two-sided | One-sided |
| Scaling | 100% | 100% | 100% | 100% |
| Finishing | Sort | — | — | — |

Unless specifically changed, each operation is performed with these default setting values with respect to all of the users. The user can change the setting values while causing the PC 102 to connect to the flash ROM 212 of the MFP 101 via the LAN 104. While, normally, the changed setting value is used on a day-to-day basis, storing a setting frequently used by the user as a favorite in the flash ROM 212 enables the user to always perform each operation with the favorite setting value.

Table 2 shows examples of favorite setting values for the respective users, which are stored in the flash ROM 212.

TABLE 2

| | User identification number | | |
|---|---|---|---|
| | 001 | 002 | 003 |
| User name | ABC | DEF | GHI |
| Copy setting | Two-sided/Color | Reduction 70% | — |
| Scan setting | Gray scale | Binary | — |
| Print setting | 2in1 | — | — |
| Fax setting | — | — | — |
| E-mail address | ABC@xxx.yyy | DEF@xxx.yyy | GHI@xxx.yyy |

If a favorite setting value is previously set as user information about a non-contact card, the setting value can be preferentially set to the flash ROM 212.

Figure 5:
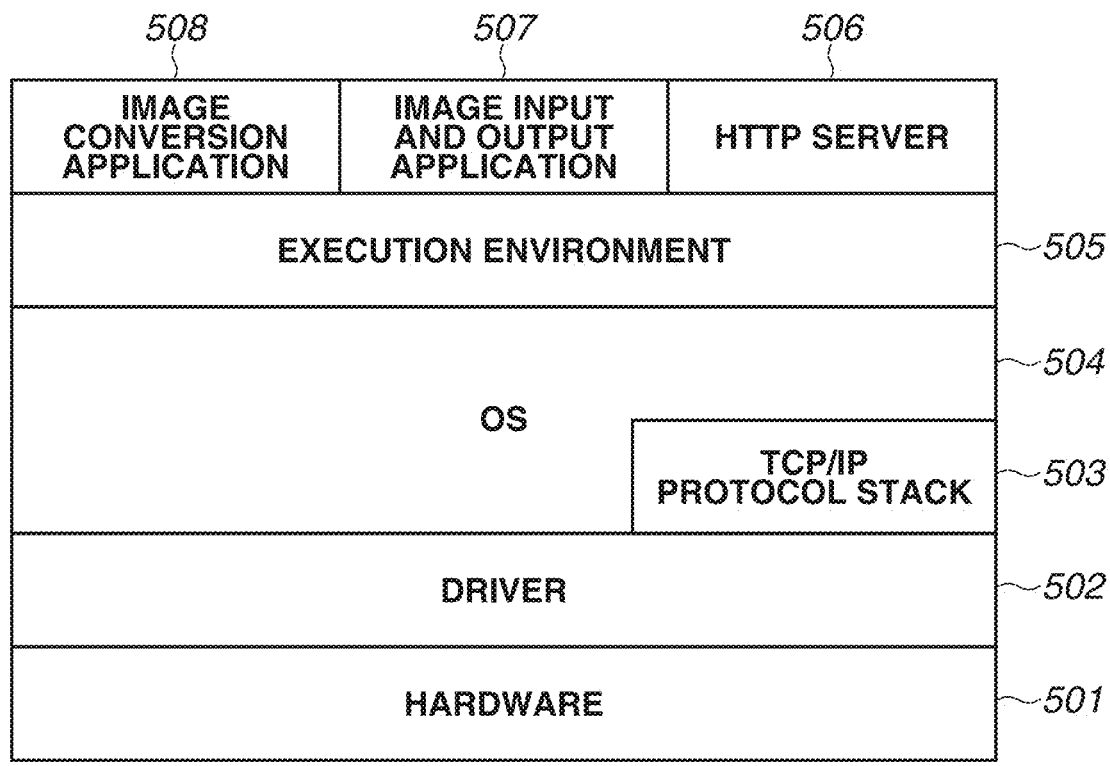
FIG. 5 is a diagram illustrating a software configuration in the MFP.

An example of the order of priority of favorite setting values for the non-contact card, favorite setting values for the MFP 101, and default setting values is as follows: Favorite setting values for the non-contact card>Favorite setting values for the MFP 101>Default setting values FIG. 5 illustrates a software configuration of the MFP 101. Hardware 501 is a hardware resource on the MFP 101 to which the CPU 201 has access. A driver 502 is software for controlling inputting and outputting performed with respect to the hardware 501. A Transmission Control Protocol/Internet Protocol (TCP/IP) protocol stack 503 performs TCP/IP communication according to the communication protocol. An operating system (OS) 504 is basic software for managing, for example, inputting and outputting performed with respect to the hardware 501 and scheduling of tasks.

An execution environment 505 provides a library that is an environment for executing an application and various services. A HyperText Transfer Protocol (HTTP) server 506 receives HTTP connection to transmit a requested file, store received data, or invoke a designated application. An image input and output application 507 accesses a file system on the HDD 208 and executes inputting or outputting of a file in response to a request from the HTTP server 506.

An image conversion application 508 performs various image conversion operations with the image processing unit 211 with respect to a scanned image associated with the user identification number in response to a request from the HTTP server 506. The execution environment 505 can be Node.js, which executes Java® Script, or can be J2EE of Java or Python. The image conversion application 508 can be configured to be directly executed by the OS 504 without via the execution environment 505.

Figure 6:
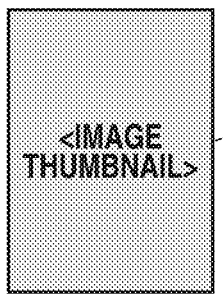
FIG. 6 is a diagram illustrating an e-mail display example in a personal computer (PC).

FIG. 6 illustrates a display example of an e-mail in the PC 102. Referring to FIG. 6, an example of a HyperText Markup Language (HTML) e-mail body region 601 is displayed. In the display example, for example, text of the e-mail body, a thumbnail display area 603 for a scanned image converted based on the default setting or favorite setting, and a button 604 for getting a converted image are displayed. An image converted based on the default setting or favorite setting is attached in a file attachment area 602.

The thumbnail display area 603 is an area for displaying a thumbnail of the attached image. The converted image getting button 604, which is operable for getting a converted image, i.e., a link button for an image conversion page, can be pressed to activate a web browser, perform HTTP connection to the HTTP server 506 of the MFP 101, and display the image conversion page on the PC 102. The image conversion page is a user-specific page that is managed with a user identification number and the date and time of scanning.

Figure 7:
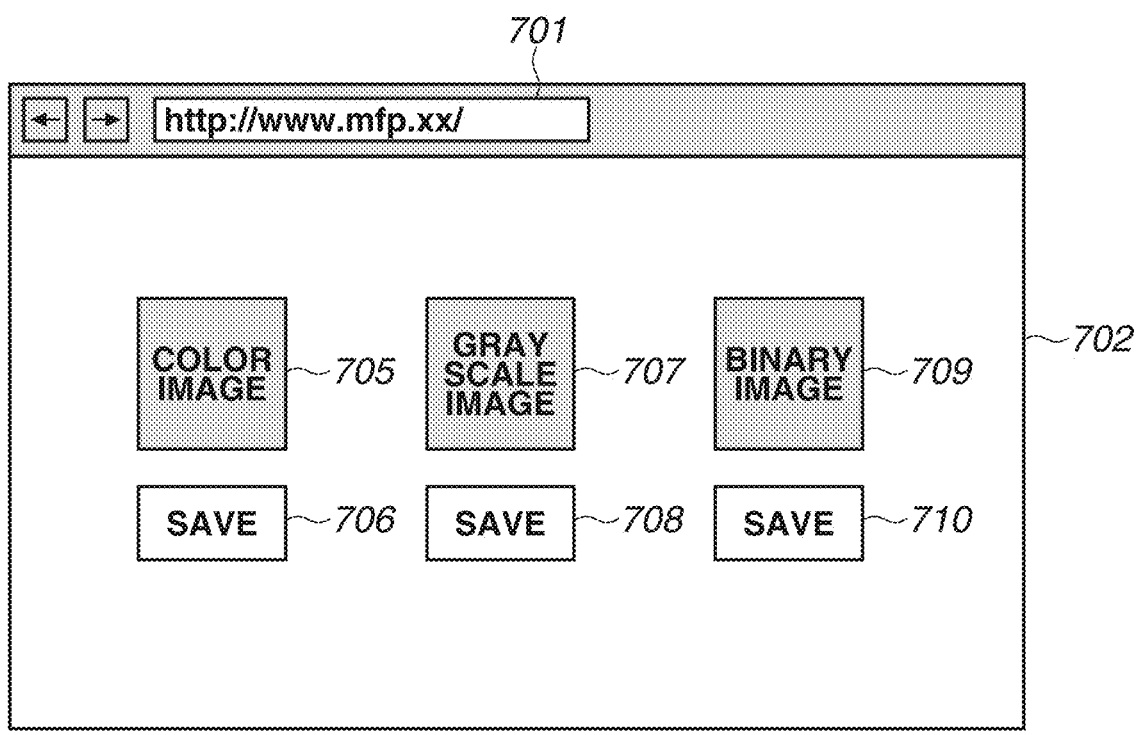
FIG. 7 is a diagram illustrating a browser display example in the PC.

FIG. 7 is a diagram illustrating a browser display example that is displayed on the PC 102 when the web browser is activated by pressing of the converted image getting button 604, i.e., the image conversion page. Referring to FIG. 7, an address bar 701 indicates a Uniform Resource Locator (URL) of the MFP 101 to which HTTP connection is being performed. A display area 702 of the image conversion page is used to display preview images 705, 707, and 709 of an image associated with the user identification number and save buttons 706, 708, and 710 for converted image files corresponding to the respective preview images. Here, the save buttons 706, 708, and 710 are buttons operable to respectively designate a color image, a gray scale image, and a binary image corresponding to the respective preview images 705, 707, and 709, as image conversion types in image conversion requests. While, in the present exemplary embodiment, color, gray scale, and binary images are illustrated as examples of image conversion processing, the present exemplary embodiment is not limited to this. For example, a configuration in which the user can set whether to perform designation of a file format (Portable Document Format (PDF)) or Joint Photographic Experts Group (JPEG)) or optical character recognition (OCR) processing, so that image conversion or file conversion is performed based on the user's setting, can be employed. Additionally, for example, functions of providing, to the user, a result of translating or summarizing text obtained by performing OCR processing or tagging the type of a document can also be provided. For example, functions of analyzing a scanned image, inferring the content of the image, and tagging information obtained as a result of the inference to the image can also be provided. Some of these processing operations can be implemented in cooperation with, for example, a cloud service that is used for image analysis.

The review image 705 for color is a displayed image obtained by reducing the size of a color image generated from the scanned image. When the save button 706 for a color image is pressed, a color image is designated as the image conversion type and a color image file subjected to image conversion by the MFP 101 in a method described below is transmitted to the PC 102 and is then stored therein.

The preview image 707 for gray scale is a displayed image obtained by reducing the size of a gray scale image generated from the scanned image. When the save button 708 for a gray scale image is pressed, a gray scale image is designated as the image conversion type and a gray scale image file subjected to image conversion by the MFP 101 in a method described below is transmitted to the PC 102 and is then stored therein.

The review image 709 for a binary image is a displayed image obtained by reducing the size of a binary image generated from the scanned image. When the save button 710 for a binary image is pressed, a binary image is designated as the image conversion type and a binary image file subjected to image conversion by the MFP 101 in a method described below is transmitted to the PC 102 and is then stored therein.

When any one of these save buttons is pressed, in response to such pressing, on the MFP 101, for example, script code of JavaScript is executed and the image conversion application 508 is activated. Accordingly, image conversion processing corresponding to the pressed save button is executed by the image processing unit 211. The converted image data is temporarily stored as a file on, for example, the HDD 208 and is then transmitted to the PC 102 by the image input and output application 507.

Next, a procedure of scan processing that is performed by the MFP 101 according to the present exemplary embodiment is described with reference to the flowchart of FIG. 8.

A program that runs on the MFP 101 according to the present flowchart is stored in, for example, the HDD 208, which is a non-volatile memory, illustrated in FIG. 2, is loaded onto the DRAM 202, which is a volatile memory, and is executed by the CPU 201. This also applies to the flowchart of FIG. 10 described below.

First, in step S801, the CPU 201 determines whether the scan button 302 of the operation unit 203, illustrated in FIG. 3, has been pressed by the user. If it is determined that the scan button 302 has been pressed (YES in step S801), then in step S802, the CPU 201 sets scan setting values to the maximum resolution, two-sided, and color regardless of favorite settings and default settings, and then the processing proceeds to step S803.

If it is determined that the scan button 302 has not been pressed (NO in step S801), then in step S812, the CPU 201 determines whether a connection request has been received from the mobile terminal 105. If it is determined that a connection request has been received from the mobile terminal 105 (YES in step S812), then in step S813, the CPU 201 performs, for example, a scan operation, a copy operation, or a print operation that is based on settings performed by application software installed on the mobile terminal 105. If it is determined that a connection request has not been received from the mobile terminal 105 (NO in step S812), the processing returns to step S801. For example, in step S813, the CPU 201 performs processing (for example, scan and send, copy, or print) according to setting information, which is set via an operation unit of the mobile terminal 105, and an execution request being received. In a case where the MFP 101 performs scan and send based on a request from the mobile terminal 105, scan data is transmitted to an address included in the setting information received from the mobile terminal 105. In this way, a scan function that is high in convenience can be provided even to a user who carries the mobile terminal 105.

In step S803, the CPU 201 determines whether the card I/F 306 has detected that the non-contact card has been held over the MFP 101 by the user. If it is determined that the non-contact card has been held (YES in step S803), then in step S804, the CPU 201 reads user information from the non-contact card via the card I/F 306. Then, in step S805, the CPU 201 performs login processing based on the read user information. Next, in step S806, the CPU 201 reads an original via the scanner unit 206 based on the above-mentioned scan setting value, thus obtaining a scanned image. Then, in step S807, the CPU 201 applies image conversion processing to the scanned image via the image processing unit 211 based on the user favorite setting values or the default setting values, and generates an image 1 (first image) that is to be transmitted while being attached to an e-mail. Accordingly, the image 1 is a color image, a gray scale image, or a binary image that is based on the user favorite setting values or the default setting values.

Next, in step S808, the CPU 201 stores the scanned image in association with the user information, for example, in a temporary user area provided in the HDD 208, for example, in a re-convertible format. At this time, it is desirable that the scanned image be stored in the form of raw data or in the form of data that is high in resolution and easy to process by image processing. The temporary user area in the HDD 208 is assigned a user identification number indicated by the user information and is associated with the user. The order of processing in steps S807 and S808 can be reversed.

Generally, raw data is an image format in which data obtained by converting the image of a scanned original into an electrical signal via an image sensor such as a charge-coupled device (CCD) sensor is directly stored as a file. The significance of this is to expect that storing the scanned image as raw data having a large amount of information causes an increase in the degree of freedom to convert the stored data into another format of data later in response to a request from the user. However, since raw data is large in capacity, taking into consideration the capacity of the HDD 208 serving as a storage destination, the scanned image can be stored in another data format that is smaller in the amount of information than raw data.

Next, in step S809, the CPU 201 generates an e-mail 1 in which the user information and a URL for accessing the image conversion page, i.e., a link to an image conversion command, are embedded. In step S810, the CPU 201 transmits the image 1 generated in step S807 as an attachment to the e-mail 1 generated in step S809 to the e-mail address indicated by the user information. Then, in step S811, the CPU 201 performs logout processing. This is because immediately performing logout processing reduces a time for which the user occupies the MFP 101 as much as possible, thus making it easier for another user to use the MFP 101.

Figure 9:
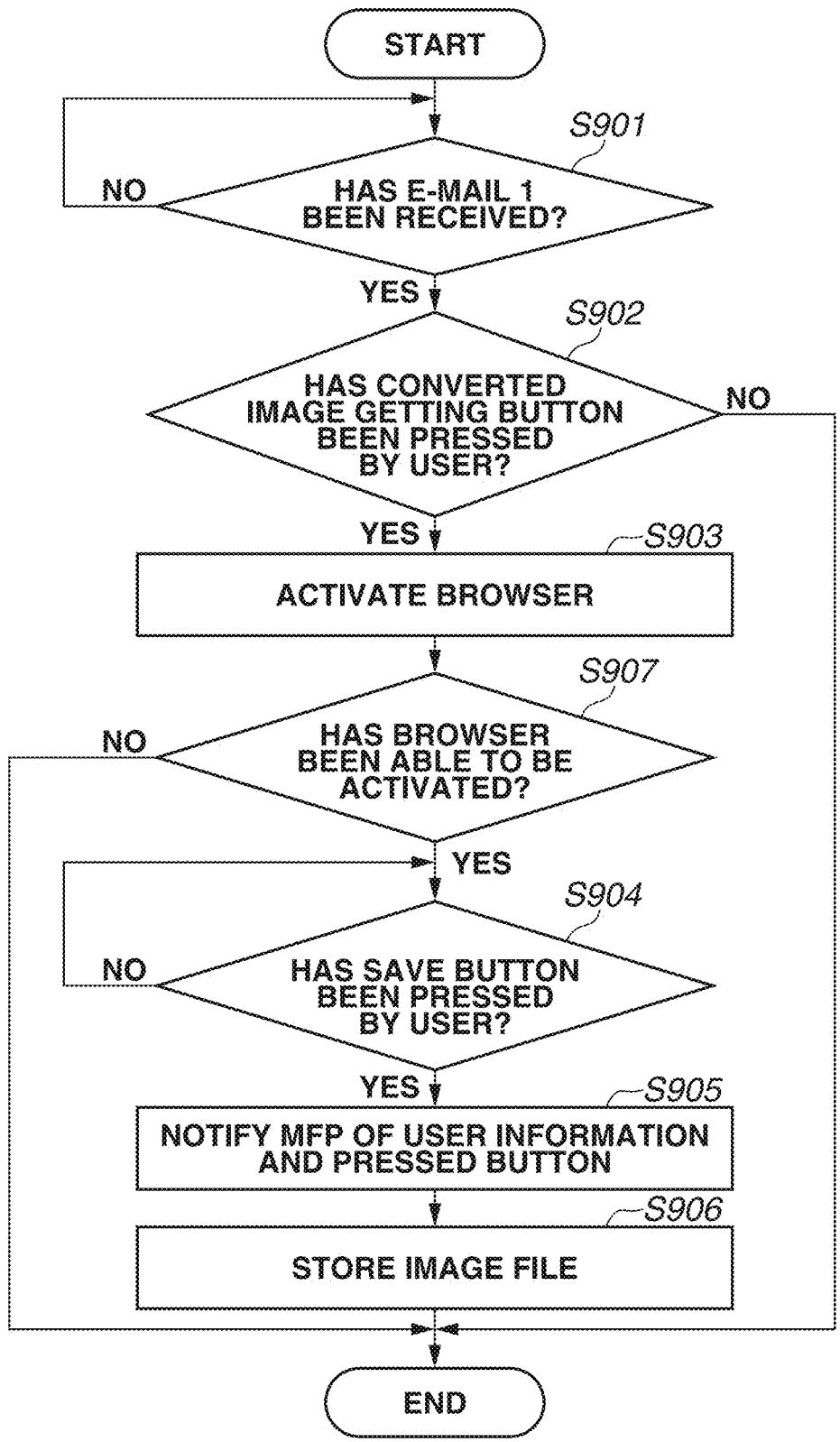
FIG. 9 is a flowchart illustrating image conversion request processing in the PC.

Next, a procedure of image conversion request processing in the PC 102 in the present exemplary embodiment is described with reference to the flowchart of FIG. 9. A program which runs on the PC 102 according to the present flowchart is stored, for example, in a non-volatile memory of the PC 102, and is loaded onto a volatile memory to be executed.

First, in step S901, the PC 102 determines whether the e-mail 1 addressed to the PC 102 has been received from the MFP 101. If it is determined that the e-mail 1 has been received (YES in step S901), then in step S902, the PC 102 determines whether, after the body of the e-mail 1 is opened by the user, the converted image getting button 604 in the e-mail body region 601 has been pressed by the user. If it is determined that the converted image getting button 604 has been pressed (YES in step S902), then in step S903, the PC 102 activates a web browser if the web browser is previously installed on the PC 102, and, then, if it is determined that the web browser has been able to be activated (YES in step S907), the PC 102 performs HTTP connection with the MFP 101 and the processing proceeds to step S904. If no web browser is previously installed and it is determined that the web browser has not been able to be activated (NO in step S907), the processing illustrated in FIG. 9 ends.

Next, in step S904, the PC 102 determines whether any save button 706, 708, or 710 in the display area 702 of the image conversion page has been pressed by the user. If it is determined that any save button has been pressed (YES in step S904), then in step S905, the PC 102 notifies the MFP 101, via HTTP connection, of the user information and the image conversion type of the image conversion request, which is information corresponding to the pressed button. Then, in step S906, the PC 102 receives, from the MFP 101 via HTTP connection, an image file (an image 2 described below) converted by the MFP 101 based on the image conversion type of the image conversion request, and the processing ends.

Figure 10:
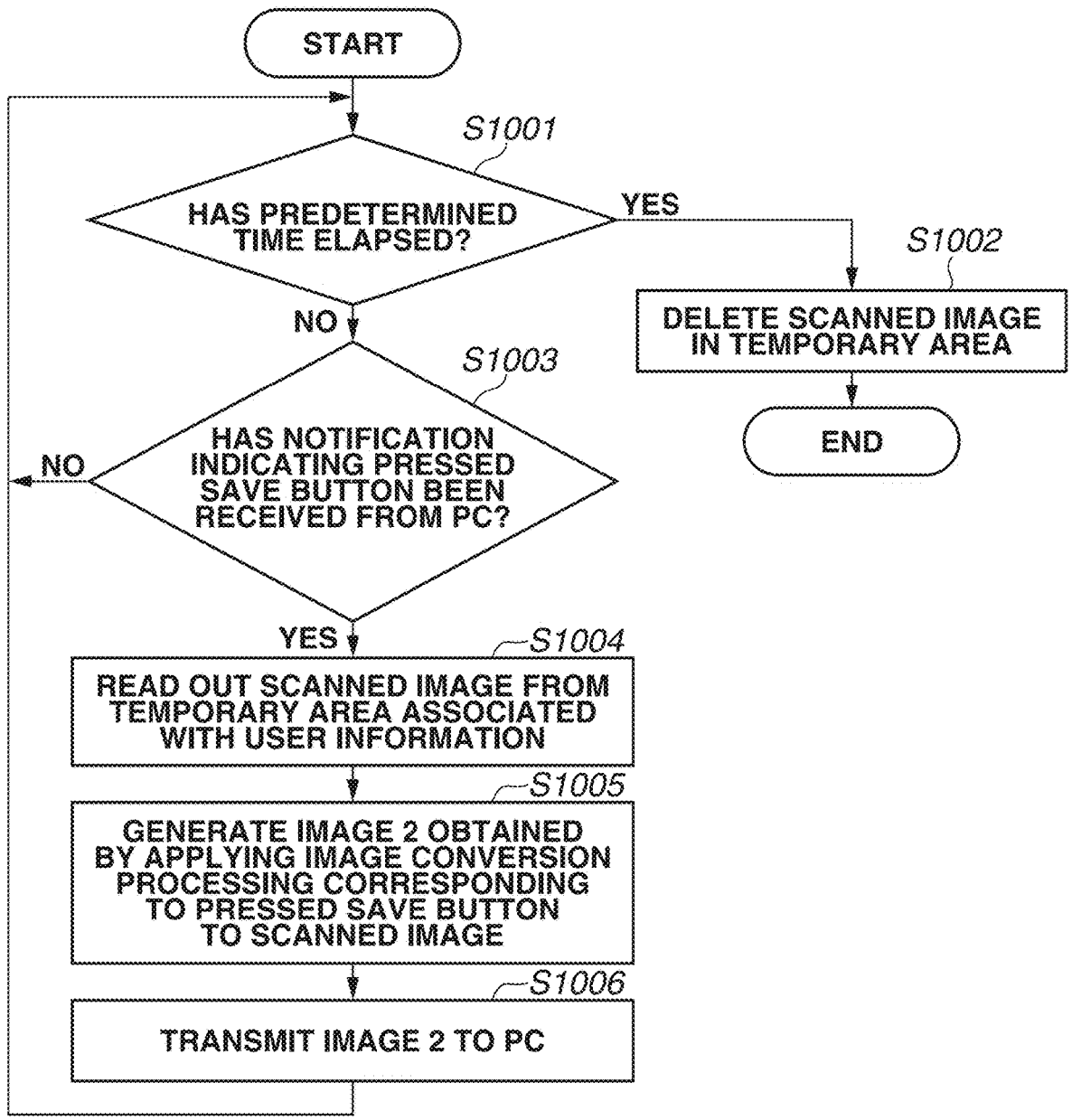
FIG. 10 is a flowchart illustrating image conversion processing in the MFP.

Next, a procedure of image conversion processing that is performed in the MFP 101 in the present exemplary embodiment is described with reference to the flowchart of FIG. 10.

First, in step S1001, the CPU 201 determines whether a predetermined time has elapsed from when scanning is performed, and, if it is determined that the predetermined time has elapsed (YES in step S1001), then in step S1002, the CPU 201 automatically deletes the scanned image in the temporary user area, and the processing ends. If it is determined that the predetermined time has still not elapsed (NO in step S1001), then in step S1003, the CPU 201 determines whether the MFP 101 has been notified by the PC 102, via HTTP connection, that any save button 706, 708, or 710 has been pressed. In other words, the CPU 201 determines whether the image conversion type of the image conversion request has been acquired. If it is determined that the MFP 101 has been notified by the PC 102 of any button being pressed, in other words, the image conversion type of the image conversion request has been acquired (YES in step S1003), the processing proceeds to step S1004.

In step S1004, the CPU 201 reads out a scanned image from the temporary user area associated with the user information. Then, in step S1005, the CPU 201 applies, to the scanned image, image conversion processing corresponding to the image conversion type of the image conversion request of the pressed save button via the image processing unit 211, thus generating an image 2 (second image). For example, in a case where the save button 706 has been pressed, the CPU 201 generates a color image (image 2).

In a case where the save button 708 or 710 has been pressed, the CPU 201 applies image conversion processing into gray scale or image conversion processing into a binary image, respectively, to the read-out scanned image, thus generating an image 2. Then, in step S1006, the CPU 201 transmits the image 2 to the PC 102 via HTTP connection.

Accordingly, the user can obtain a desired scanned image on the PC 102.

Instead of transmitting the image 2 to the PC 102 via HTTP connection, the CPU 201 can transmit the image 2 as an attachment to an e-mail to the e-mail address indicated by the user information.

While a color image, a gray scale image, and a binary image are illustrated as examples of the image conversion type, the present exemplary embodiment is not limited to this.

When the MFP 101 is notified of the save button pressed by the user, since there is a possibility that another save button may be pressed by the user at a later time, a configuration in which, even if a predetermined time has elapsed, a scanned image for the user is not automatically deleted can be employed. For example, the scanned image can be transferred from the temporary user area in the HDD 208 to another area, which is then newly associated with the user, so that the scanned image can be excluded from targets for deletion. In this case, the user can connect to the PC 102 to the MFP 101 and explicitly delete the scanned image.

As described above, the image 1, which has been obtained with favorite settings or default settings, is attached to the e-mail 1 and is then transmitted from the MFP 101 to the address that is based on the user information (PC 102). In a case where the user, who has received the e-mail 1 via the PC 102, wants to change the type of the image 1, the user presses the converted image getting button 604 displayed in the e-mail body region 601 of the e-mail 1 and then presses a button indicating the favorite image type from among the save buttons 706, 708, and 710. Then, in the MFP 101, the scanned image is converted into an image corresponding to the image conversion type indicated by the pressed save button and is then transmitted as the image 2 to the PC 102. In this way, without designating setting of the type of an image at the time of a scan operation at the MFP 101, the user can designate the favorite image type at, for example, the user's own external user terminal, thus being able to easily obtain the desired image at, for example, the user's own external user terminal.

The present exemplary embodiment can also be applied to such a configuration as to transmit a scanned image to a cloud service that a cloud server on a network provides and provide an image conversion function or image acquisition function via the cloud service.

Figure 8:
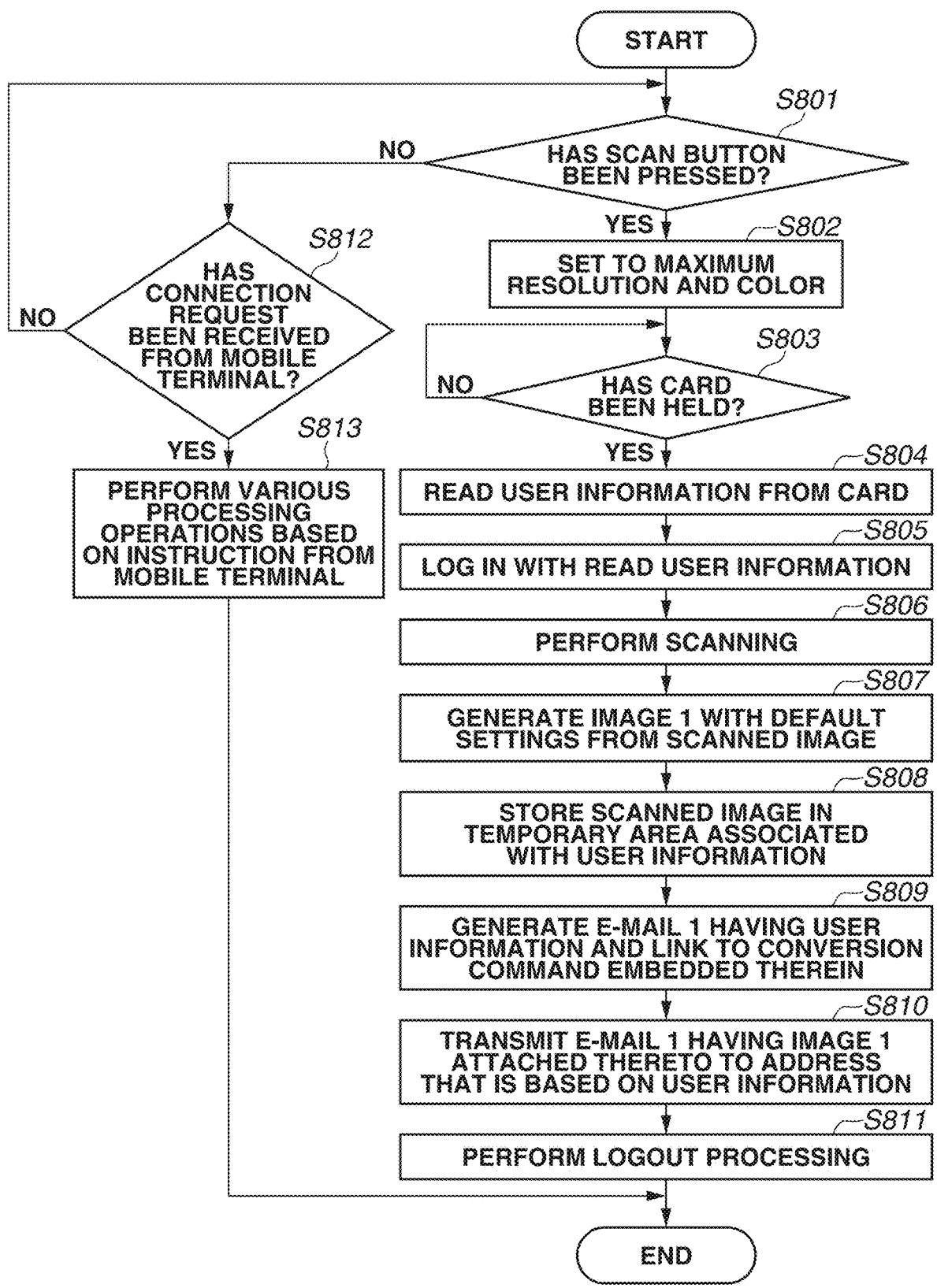
FIG. 8 is a flowchart illustrating scan processing in the MFP.

In that case, in the processing procedure illustrated in FIG. 8, instead of the processing for storing the scanned image in step S808, the following processing is performed. Specifically, the MFP 101 transmits a registration request including a scanned image and user identification information to the cloud service. This processing requests the cloud service to register content. The cloud service, which has received the scanned image and the user identification information, stores the scanned image and the user identification information while associating them with each other. Next, the cloud service issues, to the MFP 101, an access URL for accessing a page for processing a scanned image stored as a resource (content) in the cloud. The cloud service transmits the access URL to the MFP 101 as a response to the registration request.

Then, in the processing procedure illustrated in FIG. 8, instead of steps S809 and S810, the following processing is performed. The MFP 101 performs processing for transmitting an e-mail including the access URL issued by the cloud service and an image converted with the default settings (image 1) to the e-mail address indicated by the user information. Accordingly, the e-mail that the user receives includes the image converted with the default settings and the access URL for accessing the cloud service.

Accordingly, the user, who has received the e-mail at the PC 102, can access the page that the cloud service provides, so that the user accesses a web page that the cloud service provides via a web browser of the PC 102. Therefore, the user can perform desired image conversion on a web base and download a desired image.

As described above, according to the present exemplary embodiment, in an image processing apparatus (MFP 101) connected to an external user terminal (PC 102) via a network, a scanner unit (206, S806) optically reads an original to obtain a scanned image. An information acquisition unit (201, 203, 306, 307, S803 to S805) acquires user information. An image storing unit (201, 208, S808) stores the scanned image in association with the user information. A first image conversion unit (201, 211, S807) converts the scanned image into a first image based on a setting value, and a first transmission unit (201, 204, S809 to S810, FIG. 6) transmits an e-mail having the user information embedded therein and the first image attached thereto to the external user terminal. A type acquisition unit (201, S1003, FIG. 7) acquires an image conversion type indicating an image type after a desired conversion of the first image from the external user terminal responding to the e-mail. In response to acquisition of the image conversion type, a second image conversion unit (201, 211, S1004, S1005) reads out the scanned image from the image storing unit based on the user information, and converts the read-out scanned image into a second image corresponding to the acquired image conversion type. A second transmission unit (201, 204, S1006) transmits the second image to the external user terminal.

According to the present exemplary embodiment, an image processing apparatus (MFP 101), which performs processing based on an operation of the user who is logged into the image processing apparatus, includes a reception unit (203), a scanner unit (206, S806), which reads an original, a data generation unit (S806 S807), and a transmission unit (S809, S810). The reception unit receives an operation performed by a user who is logged in. In response to the reception unit receiving an operation for performing transmission processing by the logged-in user, the data generation unit generates data that is based on an image obtained by the scanner unit reading an original based on a predetermined setting. The transmission unit transmits information including at least the data generated by the generation unit and a URL for accessing a web service for acquiring data related to the generated data to an address associated with the logged-in user.

Accordingly, according to the present exemplary embodiment, without designating setting of the type of an image at the time of a scan operation at the image processing apparatus, the user can designate a desired image type at, for example, the user's own external user terminal, thus being able to easily obtain the desired image at, for example, the user's own external user terminal. Even if a display unit of the operation unit for issuing, for example, a scan instruction is omitted from the image processing apparatus or the display unit is configured as a simple and inexpensive one, the user can easily obtain the desired image at, for example, the user's own external user terminal.

One or more functions of the above-described exemplary embodiment can be implemented by supplying a program to a system or apparatus via a network or a storage medium and causing one or more processors included in a computer of the system or apparatus to read out and execute the program. The above-described exemplary embodiments can also be implemented by a circuit that implements one or more of the functions (for example, an application specific integrated circuit (ASIC)).

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-010404 filed Jan. 25, 2018, which is hereby incorporated by reference herein in its entirety.

What is claimed is:

1. An image processing apparatus which is able to communicate with an external apparatus and which inputs identification information, the image processing apparatus comprising:
- a scanner that scans a document sheet and generates a color image of the document sheet;
- a memory that stores the generated color image in an area corresponding to the input identification information; and
- a communicator that receives, from the external apparatus, identification information and a request,
- wherein, if the identification information and the request are received from the external apparatus and the request is a color request, the image processing apparatus transmits, to the external apparatus, the color image stored in an area corresponding to the received identification information, and
- wherein, if the identification information and the request are received and the request is a monochrome request, the image processing apparatus transmits, to the external apparatus, a monochrome image which is converted from the color image.

2. The image processing apparatus according to claim 1, further comprising an interface (I/F) that inputs the identification information.

3. The image processing apparatus according to claim 1, wherein the memory stores the color image as raw data.

4. The image processing apparatus according to claim 1, wherein the monochrome request is a gray scale request.

5. The image processing apparatus according to claim 1, wherein, when a predetermined time elapses from when the color image is stored in the memory, the stored color image is automatically deleted.

6. The image processing apparatus according to claim 1, wherein the controller generates an email including a link for receiving the color image stored in the memory,
- wherein the image processing apparatus transmits the email to the external apparatus, and
- wherein the image processing apparatus transmits the color image or the monochrome image to the external apparatus based on a URL included in the email.

7. A method for an image processing apparatus which is able to communicate with an external apparatus and which inputs identification information, the method comprising:
- scanning a document sheet and generating a color image of the document sheet;
- storing the generated color image in an area corresponding to the input identification information;
- receiving, from the external apparatus, identification information and a request;
- if the identification information and the request are received and the request is a color request, transmitting, to the external apparatus, the color image stored in an area corresponding to the received identification information; and
- if the identification information and the request are received and the request is a monochrome request, transmitting, to the external apparatus, a monochrome image which is converted from the color image.

8. The image processing apparatus according to claim 1,
- wherein the communicator receives, via a network from the external apparatus, the identification information and the request, and
- wherein the image processing apparatus transmits the color image or the monochrome image to the external apparatus via the network.

9. The method according to claim 7, wherein the identification information and the request are received via a network from the external apparatus, and
- wherein the color image is transmitted to the external apparatus via the network if the request is the color request.

10. The image processing apparatus according to claim 1, wherein the identification information is user information.

11. The image processing apparatus according to claim 1, further comprising:
- a card reader,
- wherein the identification information is input from the card reader.

12. An image processing apparatus which is able to communicate with an external apparatus and which inputs identification information, the image processing apparatus comprising:
- a scanner that scans a document sheet and generates an image of the document sheet;
- a memory that stores the generated image in an area corresponding to the input identification information; and
- a communicator that receives, from the external apparatus, identification information and a request for the image,
- wherein, in accordance with reception of the identification information and the request, the image processing apparatus transmits, to the external apparatus, the image stored in an area corresponding to the received identification information.

* * * * *